United States Patent [19]
Gross et al.

[11] Patent Number: 5,658,616
[45] Date of Patent: Aug. 19, 1997

[54] PROCESS FOR SPRAY-PAINTING WITH AQUEOUS PAINTS

[75] Inventors: Lutz Werner Gross, Haltern; Egon Wegner; Dietmar Chmielewski, both of Münster, all of Germany

[73] Assignee: BASF Lacke + Farben, AG, Muenster-Hiltrup, Germany

[21] Appl. No.: 571,936

[22] PCT Filed: Jun. 20, 1994

[86] PCT No.: PCT/EP94/02011

§ 371 Date: Feb. 12, 1996

§ 102(e) Date: Feb. 12, 1996

[87] PCT Pub. No.: WO95/02010

PCT Pub. Date: Jan. 19, 1995

[30] Foreign Application Priority Data

Jul. 9, 1993 [DE] Germany ............... 43 22 972.7

[51] Int. Cl.$^6$ ............... B05D 1/02; B05D 7/14; B05D 3/00
[52] U.S. Cl. ............... 427/345; 427/388.4; 427/409; 427/421
[58] Field of Search ............... 427/345, 421, 427/409, 388.4

[56] References Cited

U.S. PATENT DOCUMENTS

| | | | |
|---|---|---|---|
| 2,848,353 | 8/1958 | Norris | 427/345 |
| 4,044,175 | 8/1977 | Coxon et al. | 427/345 |
| 4,607,592 | 8/1986 | Richter | 427/345 |
| 4,696,245 | 9/1987 | Spindler | 427/345 |
| 4,980,030 | 12/1990 | Johnson et al. | 427/345 |
| 5,223,306 | 6/1993 | Bartow | 427/345 |
| 5,453,301 | 9/1995 | Saatweber et al. | 427/345 |

OTHER PUBLICATIONS

Dr. Hans Sutter, "Wasserlackrecycling bei der Spritzlackierung Teil 1", JOT 1992, pp. 1–4 (no month available).

Dr. Hans Sutter, "Wasserlackrecycling bei der Spritzlackierung Teil 2", JOT 1993, pp. 1–5 (no month available).

Johann Halbartschlager, "Neuester stand beim Wasserlack-Recycling" JOT 1993, pp. 1–4 (no month available).

*Primary Examiner*—Diana Dudash

[57] ABSTRACT

The invention relates to a process for spray-painting with aqueous paints, in which paints with different colors are processed, recovered paint is recycled, if desired after admixing with newly supplied paint (fresh paint), to the coating operation, and (a) the substrates are selected such that some of the substrates can painted using a mixture of the paints with different colors ("mixed paint"), and (b) the substrates are selected such that the proportion of the paints with different colors in the overall amount of paint processed is from 10 to 90% by weight, and (c) the substrates are selected such that the proportion in which the paints with different colors are processed corresponds to the proportional content of the paints with different colors in the mixed paint, and/or (d) care is taken, by selecting the color of the fresh paint which is admixed, to ensure that the recovered paint has the same color as the mixed paint.

7 Claims, No Drawings

PROCESS FOR SPRAY-PAINTING WITH AQUEOUS PAINTS

The invention relates to a process for spray-painting with aqueous paints, in which two or more aqueous paints with different hues or colors are processed in a single coating unit and the paint which has not gone onto the substrate to be painted (overspray) is washed out of the exhaust air from the coating unit and washed off the parts of the coating unit which come into contact with overspray, using water, and the water in which overspray has accumulated is concentrated and is recycled as recovered aqueous paint, if desired after admixing with newly supplied paint (fresh paint), to the coating operation.

In spray-painting with aqueous paints the paint which has not gone onto the substrate to be painted (overspray) is washed out of the exhaust air from the coating unit and washed off the parts of the coating unit which come into contact with overspray, using water. In this process water in which overspray has accumulated is obtained, and has to be disposed of. For this purpose the overspray is precipitated from the water in which overspray has accumulated. This results in a paint sludge, which can only be reprocessed to give other products to a limited extent and which in many cases has to be disposed of as waste.

Alternative proposals for recovering the overspray from water in which overspray has accumulated include processes in which the water in which overspray has accumulated is concentrated until the solids concentration of the aqueous paint originally employed is reached again. The recovered aqueous paint obtained in this way can be recycled, directly or after admixing with newly supplied paint (fresh paint), to the coating operation (cf. for example Journal für Oberflächentechnik (JOT), 1992, issue 10, pp. 32 to 38).

This process is well suited when one paint in one color is processed over relatively long periods of time. However, in practice—especially when finishing car bodies—a frequent change in the colors of the paints employed is necessary. The recovered paint then has a mixed color which varies, in some cases continuously, depending on the color and quantity of the processed paints. Hitherto, paints of mixed color recovered from units in which paints with different colors are processed have been employed for painting those regions of the substrates to be coated which are generally out of sight. This solution to the problem is unsatisfactory because, in general—if at all [sic]—it is not possible to use all of the quantity of recovered paint obtained in a coating unit in this way. The remaining quantity of recovered paint must then, disadvantageously, either be processed in other coating units, as described in Journal für Oberflächentechnik (JOT), 1993, issue 3, on pages 27, 30 and 31 depigmented by microfiltration or even disposed of as unusable waste. In the Journal für Oberflächentechnik (JOT), 1993, issue 3, pages 26 to 32 it is proposed, moreover, to extend coating units in which the color of the paints processed undergoes frequent changes by the installation of additional working tanks, tanks for retained material and pumps, in order to enable the separate processing of the overspray from the different paints. This solution to the problem, however, has the disadvantages that it is associated with additional costs, and, moreover, that it requires the coating unit to be cleaned before each change of color.

The object of the present invention consists in the provision of a process for spray-painting, of the type described above, in which the disadvantages of the prior art are eliminated or reduced.

It has been possible, surprisingly, to achieve this object by a process for spray-painting, of the type described above, which is characterized in that (a) the nature and amount of the substrates to be painted in the coating unit are selected such that some of the substrates to be painted in the coating unit can be painted using a mixture of the aqueous paints with different hues or colors ("mixed paint") which are to be processed in the coating unit, and (b) in that [sic] the nature and amount of the substrates to be painted in the coating unit are selected such that the total amount of aqueous paints of different hues or colors processed in the coating unit, as a proportion of the overall amount of paint processed in the coating unit (=sum of the total amount of aqueous paints with different colors processed in the coating unit and the total amount of recovered aqueous paint which may contain fresh paint and is processed in the coating unit).is from 10 to 90, preferably from 30 to 70, particularly preferably from 40 to 60% by weight, and (c) in that [sic] the nature and amount of the substrates to be painted in the coating unit are selected such that the proportion in which the aqueous paints of different hues or colors are processed corresponds approximately to the proportional content of the aqueous paints with different colors in the mixed paint described in a), and/or (d) care is taken, by selecting the color of the fresh paint which is admixed if desired, to ensure that the recovered aqueous paint has essentially the same color as the mixed paint described in (a).

The process according to the invention makes it possible to utilize all of the recovered aqueous paint in the same coating unit, even in coating units in which a frequent change is necessary in the colors of the paints processed, without extending the coating unit and with substantially lower expenditure for cleaning the coating unit.

Processes for spray-painting with aqueous paints, in which two or more aqueous paints with different colors are processed in a single coating unit and the paint which has not gone onto the substrate to be painted (overspray) is washed out of the exhaust air from the coating unit and washed off the parts of the coating unit which come into contact with overspray, using water, and the water in which overspray has accumulated is concentrated and is recycled as recovered aqueous paint, if desired after admixing with newly supplied paint (fresh paint), to the coating operation, are known and are described in, for example, Journal für Oberflächentechnik (JOT), 1992, issue 10, page 32 to 38 and in Journal für Oberflächentechnik (JOT), 1993, issue 3, page 26 to 32. With regard to further information on the prior art, in particular with regard to the washing-out or washing-off of the overspray, to the concentration of the water in which overspray has accumulated and to the general design of coating units which are suitable for the processes under discussion, reference is made to EP-A-307 047, EP-A-245 863, EP-A-137 877, EP-A-127 685, EP-A-318 827, EP-A-271 015, EP-A-217 212, DE-A-38 00980 and CH-4615/89-4.

The water in which overspray has accumulated can be concentrated in a variety of ways, for example by mechanical deposition using, for example, centrifuges or decanters, with the aid of membrane processes, especially with the aid of ultrafiltration, with the aid of thermal processes (e.g. vacuum evaporation) or with the use of electrophoretic deposition, or by a combination of one or more of the methods listed. The concentration of the water in which overspray has accumulated is preferably carried out with the aid of ultrafiltration. Apparatus suitable for concentrating the water in which overspray is accumulated is commercially available from, for example, Eisenman, Holzgerlingen FRG.

Those features of the process according to the invention which are essential to the invention will be explained exemplarily using the example of the finishing of car bodies with aqueous fillers of different colors.

The conventional finishing of car bodies comprises a first step in which an electrodeposition coat is applied, over which a filler coat is-applied after the baking operation. The filler coat is then baked or, while still unbaked, is coated over with a one-coat or multi-coat, in particular a two-coat, topcoat finish. Finally the topcoat is baked, the filler coat also being baked in cases where the topcoat has been applied to the unbaked filler coat.

The principal functions of the filler coat are to compensate for unevenness and defects in the electro-deposition coat and to improve the stone-chip resistance of the overall finish.

There is often a desire, however, to provide the car bodies with topcoats which, because of the nature and quantity of the color pigments employed, are not able completely to hide the substrate at the coat thicknesses conventionally employed. In such cases the fillers employed themselves have a color which is such that the non-hiding topcoat exhibits the desired color. Fillers with colors adapted to the color of the topcoat are also employed in many cases so that, in the case of damage caused by stone chips, the damaged areas of the finish are not so obvious, as is the case with filler coats whose color is very different from that of the topcoat. Often, because of the changing colors of the topcoats, the color of the fillers employed must also vary accordingly. The nature and quantity of the oar bodies to be finished with the different-colored topcoats is regulated by the demand from the market. To allow the process according to the invention to be carried out, in a first step it must be ascertained which different colors are absolutely necessary for the fillers to be employed. The colors of the fillers depend—as outlined above—on the colors of the desired topcoats. As soon as it is established how many fillers with different colors are required, which colors these different-colored fillers are to have and in what quantities the respective fillers are used, in a second step a mixture of the fillers with different colors is prepared, which mixture contains the fillers with different colors in the proportion in which the different-colored fillers are used. The resulting "mixed filler" or "mixed paint" is then tested as to the extent to which it can be employed as filler, on the basis of its color, for the maximum amount of topcoats to be applied. By varying the proportions in which the fillers with different colors are mixed, the color of the "mixed filler" or "mixed paint" can be varied until the quantity of topcoats to be processed, and for which the "mixed filler" or "mixed paint" can be employed on the basis of its color, is as large as possible, and, at the same time, until the proportional content of the fillers with different colors in the "mixed filler" or "mixed paint" is as close as possible to the proportion in which the fillers with different colors are used.

To carry out the process according to the invention, it is also necessary for the nature and amount of the substrates to be painted (the car bodies to be finished in the example described above), which are to be painted in the coating unit under discussion, to be selected such that the total amount of aqueous paints of different colors processed in the coating unit, as a proportion of the overall amount of paint processed in the coating unit (=sum of the total amount of aqueous paints with different colors processed in the coating unit and the total amount of recovered aqueous paint which may contain fresh paint and is processed in the coating unit) is from 10 to 90, preferably from 30 to 70, particularly preferably from 40 to 60% by weight.

In order to enable the recycling of as much as possible of the recovered aqueous paint, care is to be taken in accordance with the invention to ensure that the recovered aqueous paint, which may contain admixed fresh paint, has essentially the same color as the "mixed paint"("mixed filler" in the example) described above. "Essentially" is intended to denote that it is often possible in practice to tolerate more or less slight deviations in color, but that it is preferred for the color of the recovered aqueous paint to match the color of the "mixed paint".

The color of the recovered aqueous paint can be influenced, by selecting the proportion in which the aqueous paints with different colors are processed and/or by selecting the color of the fresh paint which is admixed if desired, such that it essentially matches the color of the mixed paint described in (a). The proportion in which the aqueous paints with different colors are processed is selected by way of a corresponding selection of the substrates to be painted in the coating unit. The closer the proportion in which the aqueous paints with different colors are processed is to the proportional content of the aqueous paints with different colors in the mixed paint described in (a), the less the need for correction by adding appropriately colored fresh paints. The formulation "approximately" should be understood, in context, like the formulation "essentially" explained above. The possibilities for adapting the color of the recovered aqueous paint to the color of the "mixed paint", by admixing appropriately colored fresh paints, become lesser the higher the total amount of aqueous paints with different colors processed in the coating unit as a proportion of the overall amount of paint processed in the coating unit. This means that, as the proportion of the aqueous paints with different colors which are processed in the coating unit in the overall amount of paint processed in the coating unit becomes higher, the adaptation of the color of the recovered paint to the color of the mixed paint must be effected to an increasing extent by way of the proportion in which the aqueous paints with different colors are processed, which means that the proportion in which the aqueous paints with different colors are processed, as the proportion of aqueous paints with different colors which are processed in the coating unit in the overall amount of paint processed in the coating unit becomes higher, is permitted to deviate less and less from the proportional content of the aqueous paints with different colors in the "mixed paint".

The process according to the invention is preferably employed for the finishing of car bodies with aqueous fillers which have different colors. It can, however, be applied to all spray-painting processes using aqueous paints, in which two or more aqueous paints with different colors are processed in a single coating unit and the paint which has not gone onto the substrate to be painted (overspray) is washed out of the exhaust air from the coating unit and washed off the parts of the coating unit which come into contact with overspray, using water, and the water in which over-spray has accumulated is concentrated and is recycled as recovered aqueous paint, if desired after admixing with newly supplied paint (fresh paint), to the coating operation.

We claim:

1. Process for spray painting one or more substrates in a coating unit with aqueous paints, wherein two or more aqueous paints with different hues or colors are processed in a single coating unit, comprising applying the paints to the substrates, and recovering the overspray of the paints, wherein the overspray is a mixture of the paints of different hues or colors, optionally, adding fresh paint to the recovered paint, selecting one or more substrates, where the desired coating color for the substrate is the color of the recovered mixed paint, and reusing the recovered paint in the spray painting process to coat the selected substrate, wherein overspray is recovered by
  (i) washing with water, the overspray paint from the exhaust air of the coating unit and from the parts of the coating unit which come into contact with overspray; and
  ii) concentrating the water in which overspray has accumulated to form recovered aqueous paint which is a mixture of paints of different colors;
wherein the amount of aqueous paints of different hues or colors processed in the coating unit is from 10 to 90% by weight, based on the sum total of paint processed in the coating unit, the sum total including aqueous paints of different hues or colors initially processed, recovered paint and fresh paint which is optionally added to the recovered paint, and the proportion of the aqueous paints having different hues or colors in the recovered paint corresponds approximately to the proportional content of the aqueous paints having different hues or colors in the paints initially applied in the coating unit.

2. The process of claim 1, further comprising the step of adding fresh paint to the recovered aqueous paint mixture.

3. Process according to claim 2, further comprising adding fresh paint to the recovered paint to ensure that the recovered aqueous paint has the same proportion of colors as the proportion of colors applied initially in the coating unit.

4. Process according to claim 1, wherein the substrates painted in the coating unit are car bodies which have been coated with an electrodeposition coat.

5. Process according to claim 1, wherein the aqueous paint is an aqueous filler paint for the finishing of car bodies.

6. Process for spray painting one or more substrates in a coating unit with aqueous paints, wherein two or more aqueous paints with different hues or colors are processed in a single coating unit, comprising applying the paints to the substrates, and recovering the overspray of the paints, wherein the overspray is a mixture of the paints of different hues or colors, adding fresh paint to the recovered paint, selecting one or more substrates, where the desired coating color for the substrate is the color of the recovered mixed paint, and reusing the recovered paint in the spray painting process to coat the selected substrate, wherein overspray is recovered by
  (i) washing with water, the overspray paint from the exhaust air of the coating unit and from the parts of the coating unit which come into contact with overspray; and
  ii) concentrating the water in which overspray has accumulated to form recovered aqueous paint which is a mixture of paints of different hues or colors;
wherein the amount of aqueous paints of different hues or colors processed in the coating unit is from 10 to 90% by weight, based on the sum total of paint processed in the coating unit, the sum total including aqueous paint of different hues or colors initially processed, recovered paint and fresh paint which is added to the recovered paint, and the fresh paint is added to the recovered paint to match the proportion of the aqueous paints having different hues or colors in the recovered paint to the proportion of the aqueous paints having different hues or colors in the paints initially applied in the coating unit.

7. The process of claim 6 wherein the coating applied to the substrate is a filler coating.

* * * * *